United States Patent
Wang

(10) Patent No.: US 6,785,651 B1
(45) Date of Patent: Aug. 31, 2004

(54) METHOD AND APPARATUS FOR PERFORMING PLAN-BASED DIALOG

(75) Inventor: Kuansan Wang, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 559 days.

(21) Appl. No.: 09/662,242

(22) Filed: Sep. 14, 2000

(51) Int. Cl.⁷ .............................................. G10L 15/00
(52) U.S. Cl. ...................... 704/246; 704/257; 379/88.01
(58) Field of Search ................................. 704/235, 246, 704/257, 270, 275; 379/88.01

(56) References Cited

U.S. PATENT DOCUMENTS

| | | | |
|---|---|---|---|
| 5,355,444 A | 10/1994 | Chirico | 395/51 |
| 5,357,596 A * | 10/1994 | Takebayashi et al. | 704/275 |
| 5,414,797 A | 5/1995 | Vassiliadis et al. | 395/51 |
| 5,748,974 A | 5/1998 | Johnson | 395/759 |
| 5,761,663 A | 6/1998 | Lagarde et al. | 707/10 |
| 5,892,813 A * | 4/1999 | Morin et al. | 379/88.01 |
| 5,982,367 A | 11/1999 | Alimpich et al. | 345/347 |
| 5,995,921 A | 11/1999 | Richards et al. | 704/9 |
| 6,044,347 A * | 3/2000 | Abella et al. | 704/272 |
| 6,173,266 B1 * | 1/2001 | Marx et al. | 704/270 |
| 6,192,354 B1 | 2/2001 | Bigus et al. | 706/46 |
| 6,199,160 B1 | 3/2001 | Echensperger et al. | 713/100 |
| 6,246,981 B1 * | 6/2001 | Papineni et al. | 704/235 |
| 6,356,869 B1 * | 3/2002 | Chapados et al. | 704/275 |
| 6,421,655 B1 * | 7/2002 | Horvitz et al. | 706/61 |
| 6,490,560 B1 * | 12/2002 | Ramaswamy et al. | 704/250 |
| 6,493,673 B1 * | 12/2002 | Ladd et al. | 704/275 |
| 6,505,162 B1 * | 1/2003 | Wang et al. | 704/275 |
| 6,567,805 B1 * | 5/2003 | Johnson et al. | 707/5 |

OTHER PUBLICATIONS

"An Event–Driven Model for Dialogue System," by K. Wang, Proc. ICSLP–98, (Dec. 1998).
"How May I Help You?" by A. Gorrin et al., Speech Communications, vol. 23, (1997).
"A Stochastic Model of Human–Machine Interaction for Learning Dialog Strategies," IEEE Transactions on Speech and Audio Processing, vol. 8, No. 1, pp. 11–23, (Jan. 2000).
"The Thoughtful Elephant: Strategies for Spoken Dialog Systems," IEEE Transactions on Speech and Audio Processing, vol. 8, No. 1, pp. 51–62, (Jan. 2000).
"JUPITER: A Telephone–Based Conversational Interface for Weather Information," IEEE Transactions on Speech and Audio Processing, vol. 8, No. 1, pp. 85–96, (Jan. 2000).
F. Giunchiglia et al., "Understanding Scene Descriptions by Integrating Different Sources of Knowledge," International Journal of Man–Machine Studies, vol. 37, No. 1, pp. 47–81 (Jul. 1992).

(List continued on next page.)

Primary Examiner—Daniel Abebe
(74) Attorney, Agent, or Firm—Theodore M. Magee; Westman, Champlin & Kelly, P.A.

(57) ABSTRACT

The present invention provides a dialog system in which the subsystems are integrated under a single technology model. In particular, each of the sub-systems uses stochastic modeling to identify a probability for its respective output. The combined probabilities identify a most probable action to be taken by the dialog system given the latest input from the user and the past dialog states. An additional aspect of the present invention is an embodiment in which the subsystems communicate with one another through XML pages, thus allowing the sub-systems to be distributed across a distributed network.

32 Claims, 11 Drawing Sheets

OTHER PUBLICATIONS

M. Rolbert, "Reference Processing in Database Query System," Tenth International Workshop, Expert Systems and their Applications, France, pp. 161–175 (May 28–Jun. 1, 1990).

http://msdn.microsoft.com/library/en–us/wss/wss/_cdo_iperson interface.asp (Nov. 7, 2002).

Ted Pattison, "Visual Basic .NET: New Programming Model and Language Enhancements Boost Development Power", from the Feb. 2001 issue of *MSDN Magazine*.

U.S. patent application Ser. No. 10/382,433, Mau et al., filed on Dec. 23, 2002.

Jian Liu et al., "Combining Hierarchical Filtering, Fuzzy Logic, and Simulation with Software Agents for IP (Intellectual Propoerty) Selection in Electronic Design," International Journal on Artificial Intelligence Tools, vol. 10, No. 3, pp. 303–323 (Sep. 2001).

Stillger, M. et al., "A Communication Infrastructure for a Distributed RDBMS," Proceedings of the 6$^{th}$ International Euro–Par Conference, pp. 445–450 (Aug./Sep. 2000).

Devaney, M. et al., "Needles in a Haystack: Plan Recognition in Large Spatial Domains Involving Multiple Agents," Proceedings of the Fifteenth National Conference on Artificial Intelligence, pp. 942–947 (Jul. 1998).

Arai, S. et al., "Multi–Agent Reinforcement Learning for Planning and Scheduling Multiple Goals," Proceedings Fourth International Conference on MultiAgent Systems, pp. 359–360 (Jul. 2000).

Xiang, Y. et al., "Justifying Multiply Sectioned Bayesian Networks," Proceedings Fourth International Conference on MultiAgent Systems, pp. 349–356 (2000).

U.S. patent application Ser. No. 10/147,673, Wang, filed on May 16, 2002.

U.S. patent application Ser. No. 10/172,163, Wang, filed on Jun. 14, 2002.

\* cited by examiner

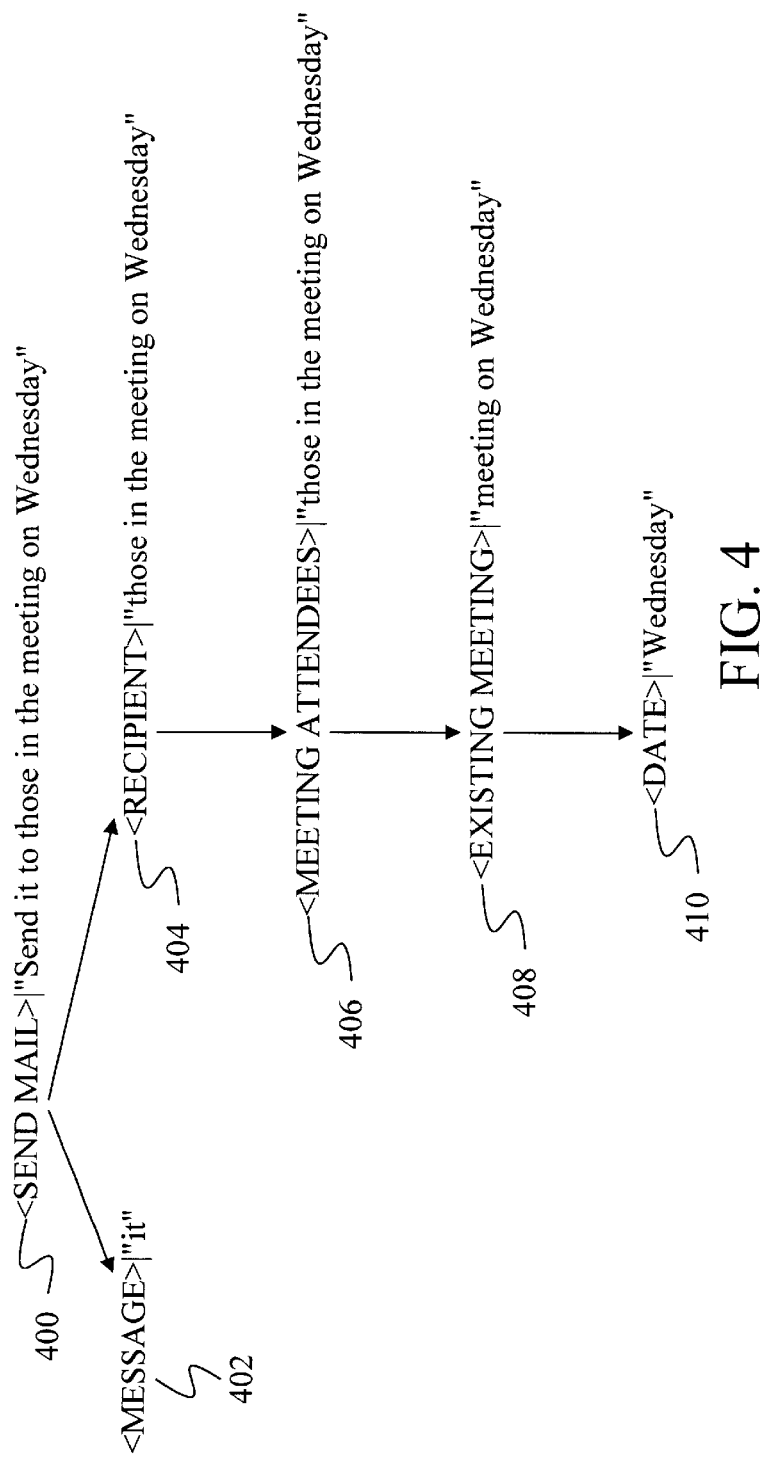
FIG. 4
FIG. 5
FIG. 9

METHOD AND APPARATUS FOR PERFORMING PLAN-BASED DIALOG

BACKGROUND OF THE INVENTION

The present invention relates to methods and systems for defining and handling user/computer interactions. In particular, the present invention relates to dialog systems.

Nearly all modern computer interfaces are based on computer driven interactions in which the user must follow an execution flow set by the computer or learn one or more commands exposed by the computer. In other words, most computer interfaces do not adapt to the manner in which the user wishes to interact with the computer, but instead force the user to interact through a specific set of interfaces.

New research, however, has focused on the idea of having a computer/user interface that is based on a dialog metaphor in which both the user and the computer system can lead or follow the dialog. Under this metaphor, the user can provide an initial question or command and the computer system can then identify ambiguity in the question or command and ask refining questions to identify a proper course of action. Note that during the refinement, the user is free to change the dialog and lead it into a new direction. Thus, the computer system must be adaptive and react to these changes in the dialog. The system must be able to recognize the information that the user has provided to the system and derive a user intention from that information. In addition, the systems must be able to convert the user intention into an appropriate action, such as asking a follow-up question or sending an e-mail message.

Note that the selection of the proper action is critical in that the quality of the user experience is dictated in large part by the number of questions that the system asks the user and, consequently, the amount of time it takes for the user to reach their goal.

In the past, such dialog systems have been created through a combination of technologies. Typically a stochastic model would be used to identify what the user has said. Such models provide probabilities for each of a set of hypothesis phrases. The hypothesis with the highest probability is then selected as the most likely phrase spoken by the user.

This most likely phrase is provided to a natural language parsing algorithm, which applies a set of natural language rules to identify the syntactic and semantic structure of the identified phrase.

The semantic structure is then passed to a plan based system, that applies a different set of rules based on the semantic meaning and the past dialog statements made by the user and the computer. Based on the execution of these rules, the dialog system selects an action that is to be taken.

Some systems have attempted to use stochastic models in the conversion from what was said to the semantic meaning of what was said. For example, in "The Thoughtful Elephant: Strategies for Spoken Dialog Systems" E. Souvignier et al., IEEE Transactions on Speech and Audio Processing, Vol. 8, No. 1 (January 2000), a stochastic model is applied to both the step of identifying of what has been said and the step of converting what has been said into a semantic meaning.

Other systems have used stochastic models to determine what action to take given a semantic meaning. For example, in "A Stochastic Model for Machine Interaction for Learning Dialog Strategies", Levin et al., IEEE Transactions on Speech and Audio Processing, Vol. 8, No. 1, pg. 11–23 (January 2000), a stochastic model is used in the conversion from a semantic meaning to an action.

Although stochastic models have been used in each of the stages separately, no system has been provided to use stochastic models in all of the stages of a dialog system that are designed to optimize the same objective function. Because of this, the sub-systems in these dialog systems do not integrate naturally with each other.

Another problem with current dialog systems is that they are not well suited for distributed computing environments with less than perfect quality of service. Telephone based dialog systems, for example, rely heavily on the telephone links. A severance in the phone connection generally leads to the loss of dialog context and interaction contents. As a result, the dialog technologies developed for phone based system cannot be applied directly to Internet environments where the interlocutors do not always maintain a sustained connection. In addition, existing dialog systems typically force the user into a fixed interface on a single device that limits the way in which the user may drive the dialog. For example, current dialog systems typically require the user to use an Internet browser or a telephone, and do not allow a user to switch dynamically to a phone interface or a handheld interface, or vice versa, in the middle of the interaction. As such, these systems do not provide as much user control as would be desired.

SUMMARY OF THE INVENTION

The present invention provides a dialog system in which the subsystems are integrated under a single technology model. In particular, each of the subsystems uses stochastic modeling to identify a probability for its respective output. The combined probabilities identify a most probable action to be taken by the dialog system given the latest input from the user and the past dialog states.

Specifically, a recognition engine is provided that uses a language model to identify a probability of a surface semantic structure given an input from a user. A semantic engine is also provided that uses a semantic model to identify a probability of a discourse structure given the probability of the surface semantic structures. Lastly, a rendering engine is provided that uses a behavior model to determine the lowest cost action that should be taken given the probabilities associated with one or more discourse structures provided by the semantic engine. By using stochastic modeling in each of the subsystems and forcing all the stages to jointly optimize a single objective function, the present invention provides a better integrated dialog system that theoretically should be easier to optimize.

An additional aspect of the present invention is an embodiment in which the recognition engine, the semantic engine and the rendering engine communicate with one another through XML pages, thus allowing the engines to be distributed across a network. By using XML, the dialog systems can take advantage of the massive infrastructure developed for the Internet.

In this embodiment, the behavior model is written or dynamically synthesized using the extensible stylesheet language (XSL) which allows the behavior model to convert the XML pages generated by the semantic engine into an output that is not only the lowest cost action given the discourse representation found in the semantic engine XML page, but is also appropriate for the output interface selected by the user. In particular, the XSL-transformations provided by the behavior model allow a single XML page output by the semantic engine to be converted into a format appropriate for an Internet browser, a phone system, or a hand-held system, for example. Thus, under this embodiment, the user is able to control which interface they use to perform the dialog, and in fact can dynamically change their interface during the dialog.

BRIEF DESCRIPTION OF THE DRAWINGS

FIG. 4 is a graphical representation of a surface semantic tree structure generated by a recognition engine for a speech input.

FIG. 5 is graphical representation of a surface semantic structure created by a recognition engine for a pointer-device input.

FIG. 9 is a graphical representation of a surface semantic structure generated by the recognition engine based on the user's response to a system question.

DETAILED DESCRIPTION OF ILLUSTRATIVE EMBODIMENTS

Figure 1:
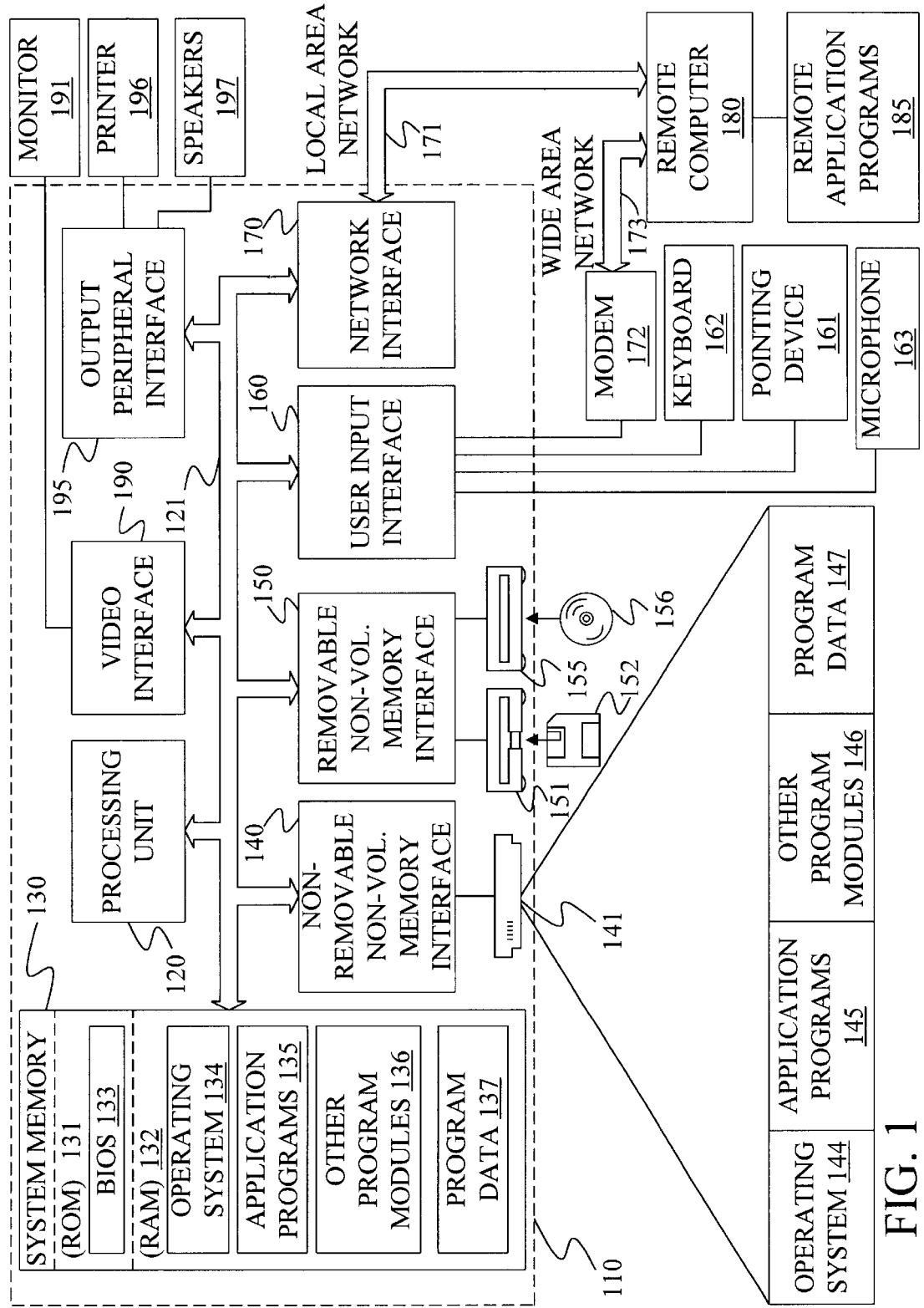
FIG. 1 is a general block diagram of a personal computing system in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices -such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
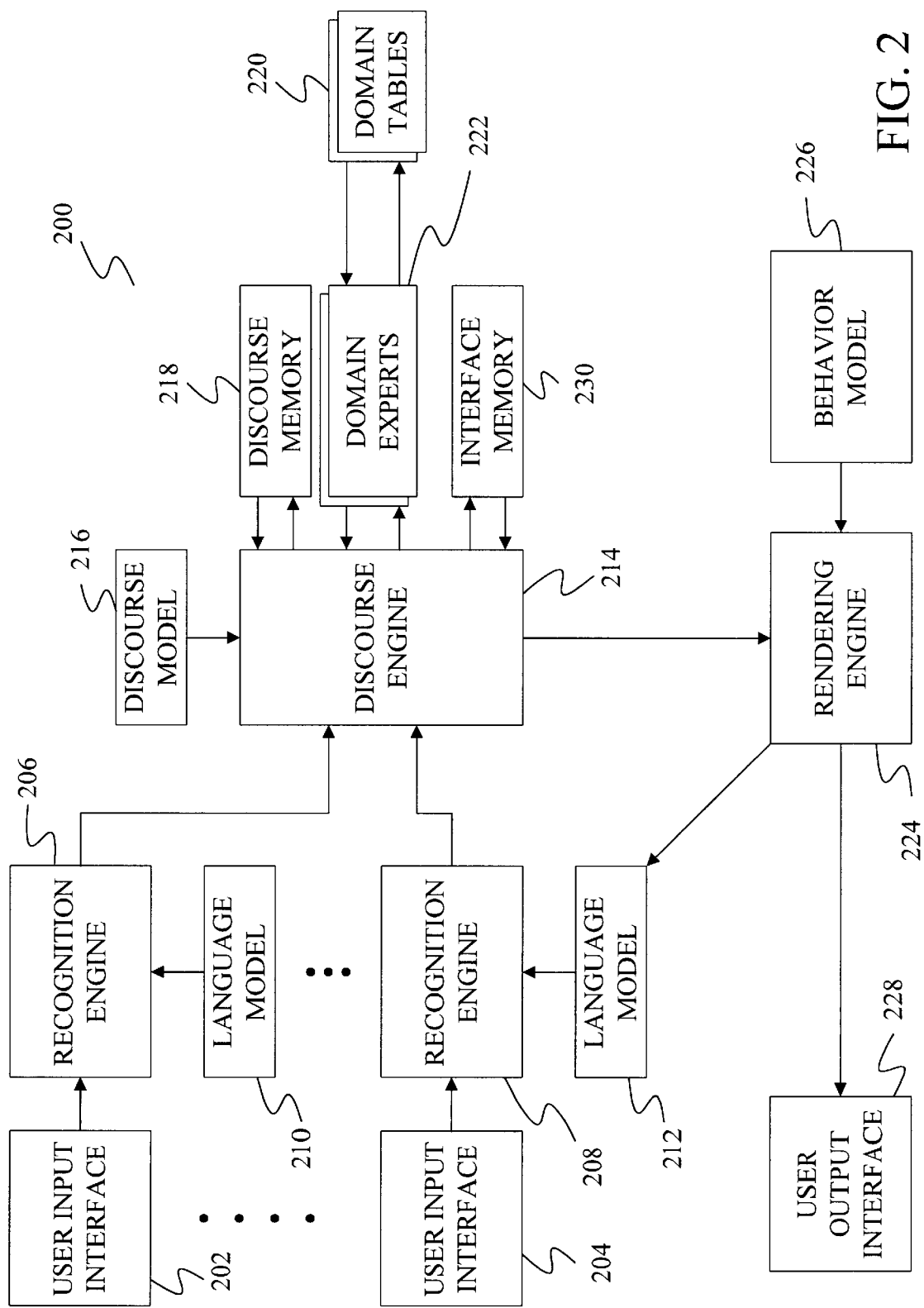
FIG. 2 is a block diagram of a dialog system of the present invention.

FIG. 2 provides a block diagram of a dialog system of the present invention. FIG. 2 is described below in connection with a dialog method shown in the flow diagram of FIG. 3.

Under one embodiment of the invention, the components of FIG. 2 are located within a personal computer system, such as the one shown in FIG. 1. In other embodiments, the components are distributed across a distributed computing environment and connected together through network connections and protocols. For example, the components could be distributed across an intranet or the Internet. A specific embodiment of the dialog system of the present invention designed for such a distributed computing environment is discussed in more detail below with reference to the block diagram of FIG. 13.

In FIG. 2, the dialog system 200 receives input from the user through a plurality of user interfaces 202, 204. Such user input interfaces include a speech capture interface capable of converting user speech into digital values, a keyboard, and a pointing device, such as a mouse or track ball. The present invention is not limited to these particular user .input interfaces and additional or alternative user input interfaces may be used with the present invention.

Each user input interface is provided to its own recognition engine 206, 208 which has an associated language model 210, 212. Recognition engines 206 and 208 use language models 210 and 212, respectively, to identify and score possible surface semantic structures to represent the respective inputs. Each recognition engine 206, 208 provides at least one surface semantic output and a score representing the probability of that semantic output. In some embodiments, :at least one of the recognition engines 206, 208 is capable of providing more than one alternative surface semantic structure with an associated score for each alternative structure. Each of the semantic structures and corresponding scores is provided to discourse engine 214. The step of generating the surface semantics is shown as step 300 in FIG. 3.

For language-based user input such as speech and handwriting, the language model used by the recognition engine can be any one of a collection of known stochastic models. For example the language model can be an N-gram model that models the probability of a word in a language given a group of N proceeding words in the input. The language model can also be a context free grammar that associates semantic and and/or syntactic information with particular words and phrases. In one embodiment of the present invention, a unified language model is used that combines an N-gram language model with a context free grammar. In this unified model, semantic and/or syntactic tokens are treated as place values for words and an N-gram probability is calculated for each hypothesized combination of words and tokens.

In several embodiments, the language model is capable of generating a hierarchical surface semantic structure that is similar to a discourse semantic structure defined in a discourse model 216 and used by a discourse engine 214. By using similar hierarchical structures in both models, it becomes easier to translate the recognized input values from the surface semantic structure to the discourse semantic structure. Note that in many embodiments, language models associated with non-linguistic inputs such as the pointing device, are also capable of attaching semantic tokens to the pointing device input in most embodiments, the semantic tokens are taken from a set of semantic tokens found in the discourse semantic structure. Thus, when a user clicks on a file icon with the mouse, the recognition engine for the mouse is capable of associating a FileName token with that act while pointing to the ID of the indicated file as the input.

Figure 3:
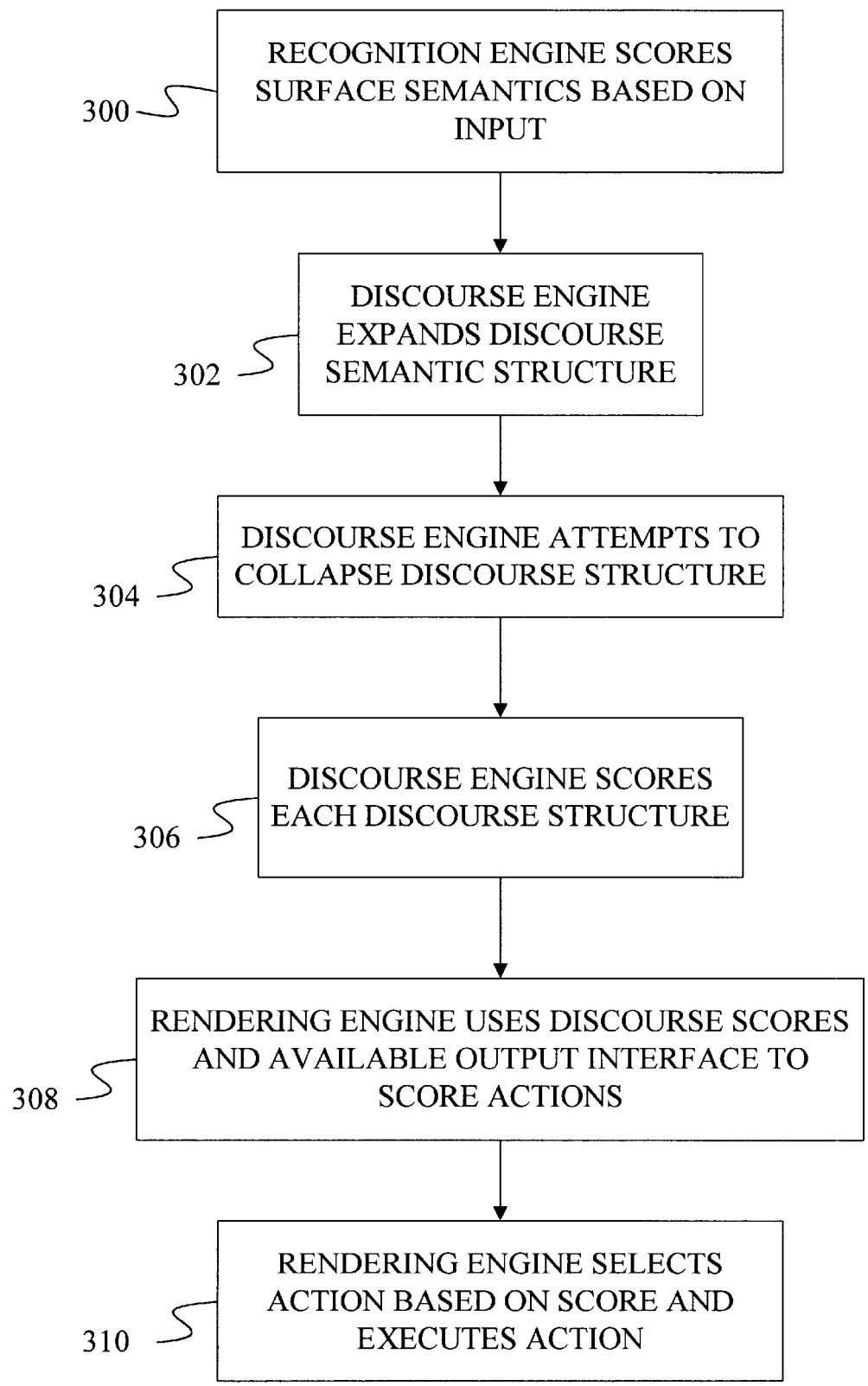
FIG. 3 is a flow diagram for a dialog method under the present invention.

As shown in step 302 of FIG. 3, when discourse engine 214 receives the surface semantics from recognition engines 206, 208, it first expands a discourse semantic tree. This expansion is performed first by examining the surface semantic structures provided to discourse engine 214. If the surface semantic structures provided to discourse engine 214 show a previously unseen high level semantic token, i.e., a digression in the dialog, a new discourse tree is instantiated in discourse engine 214.

If, on the other hand, the surface semantics provided to discourse engine 214 contain low level discourse tokens, discourse engine 214 first looks to see if the surface semantic tokens can fit in any currently opened discourse tree. If the semantic tokens can fit in a currently opened discourse tree, the tokens and their associated input values are placed in the appropriate slots of the discourse semantic structure.

If the semantic tokens do not fit within any currently active discourse structures, the discourse engine 214 looks for possible discourse trees in which the semantic tokens can be found. If a surface semantic token can be inserted into more than one structure or into more than one location within a structure, a situation known as semantic ambiguity, discourse engine 214 expands all the structures in which the token could be inserted, but does not insert the semantic token. Instead, discourse engine 214 holds the semantic token and its associated input value in a discourse memory 218 until the ambiguity as to where the semantic object should be placed has been resolved. Typically, this ambiguity is resolved by requesting additional information from the user, as discussed further below.

In most embodiments, the recognition engine is able to associate a surface semantic token with one or more input words even though the words themselves are ambiguous. For example, in a phrase such as "send it to him" the recognition engine may be able to identify that "it" refers to a message object and "him" refers to a recipient. Thus, the recognition engine is able to associate a Message token with "it" and a Recipient token with "him". However, it is not clear from the words "it" and "him" which message should be sent or which person should receive the message.

Under the present invention, discourse engine 214 attempts to clarify such ambiguities by using a discourse memory 218, which contains past values for specific semantic token types. By referring to this memory of past references to semantic token types, the system of the present invention is able to infer values for implicit references based on past discourse statements. Thus, using the example above, if a particular message had appeared recently in the discussion and a particular person had been referred to in the discussion, discourse engine 214 would replace the phrase "it" with the particular message ID and "him" with the particular person's name.

Under one embodiment of the present invention, this inferential ability is facilitated by organizing discourse memory 218 into separate priority queues. In particular, under this embodiment of the invention, discourse memory 218 is divided into a short-term memory containing values from the current user input and a long-term memory containing values from past user input.

The short-term memory is further divided into an explicit memory and an implicit memory. The explicit memory holds values that have been resolved directly from input provided by the user. For instance, if the user refers to a person by name in the beginning of a sentence, the name is placed in the explicit memory under the Person token type. The implicit memory holds values that have been resolved from indirect references made by the user such as anaphora (where an item takes its meaning from a preceding word or phrase), ellipsis (where an item is missing but can be naturally inferred), and deixis (where an item is identified by using definite articles or pronouns). Examples of such implicit references include statements such as "Send it to Jack", where "it" is an anaphora that can be resolved by looking for earlier references to items that can be sent or "Send the message to John's manager" where "John's manager is a deixis that is resolved by searching through a database, described later, to find who John's manager is. This name is then placed in the implicit memory for later use.

Under one embodiment, the three memories are prioritized such that the system looks in the explicit memory first, the long-term memory second, and the implicit memory last when attempting to resolve a reference. Thus, if a person has been explicitly referred to in the current input from the user, that person's name would take priority over a person's name that was found in the long-term memory, or a person's name that had been resolved and placed in the implicit memory.

Under one embodiment, the priority ordering of discourse memory 218 is ignored if a higher priority memory value; is inconsistent or contradicts other input provided by the user. For example, if the user refers to "her" but the last name in the explicit memory is a male name, the priority of the explicit memory would be ignored in favor of looking for the first female name in the long-term memory or the implicit memory.

Under one embodiment, before expanding the discourse semantic structure, discourse engine 214 updates discourse memory 218 while resolving indirect references in the current input from the user. In particular, discourse engine 214 updates the explicit memory based on any explicit terms found in the current input and updates the implicit memory by resolving indirect references in the current input. Under this embodiment, the resolution is done on a first-in-last-out basis for the input from the user such that explicit and implicit values in the first part of the user input are used to resolve indirect references found in later parts of the user input.

After implicit references have been resolved using discourse memory 218, the values retrieved from memory 218 are associated with their respective semantic token in the expanded discourse semantic structure.

Once discourse engine 214 has expanded the discourse semantic structure, it attempts to collapse the discourse semantic structure as much as possible at step 304. To collapse the discourse semantic structure, discourse engine 214 looks at each bottom level token to determines whether it has enough information about the semantic token to identify a single entity that can replace the token. In this context, an entity is an entry in one of a set of domain tables 220 that are accessed by one or more domain experts 222. The domain experts 222 identify which table needs to be accessed and updated, and handle the overhead and protocols associated with accessing the tables.

For example, to collapse a Person semantic token, which is a general representation of a person, discourse engine 214 attempts to find a single person that meets the attributes currently associated with the Person token. To do this, discourse engine 214 passes the attributes and the token to a domain expert 222 specializing at resolving people, which then accesses a plurality of domain tables that are associated with the Person token. In this case, domain experts 222 would access a domain table that contains a list of people.

In the person domain table, each row is identified as an entity, i.e. a person, and each column is an attribute of the person. Thus, determining whether a token can be collapsed involves determining whether the attributes of the token provide enough information that a single entity can be identified in the domain tables 220. If a single entity can be found in domain tables 220, the entity is inserted in place of the token in the discourse semantic structure.

In an embodiment that uses a tree structure for the discourse semantic structure, the semantic tokens appear as nodes on the tree, and the attributes of the token appear as children of the node. In such embodiments, discourse engine 214 attempts to collapse the discourse tree from the bottom up so that children nodes are collapsed first and the resolution of the nodes "bubbles up".

If a token can not be collapsed because more than one entity in the domain tables 220 meet the available search criteria, discourse engine 214 may choose to retrieve all of the matching entities up to some maximum number of entities. Discourse Engine 214 may also utilize the discourse model 216 to aid the evaluation process in step 304 and discard hypotheses with low probabilities. Either way, discourse engine 214 then augments the discourse semantic structure with these alternative possibilities extending from the unresolved token.

At step 306 of FIG. 3, discourse engine 214 uses discourse model 216 to generate scores that describe the likelihood of each discourse semantic structure. In this context, each entity extending from an unresolved semantic token is considered to be part of a separate discourse semantic structure, even though they share common semantic tokens. Thus, discourse engine 214 generates a separate score for each entity extending from an unresolved token. Note that in some embodiments, step 304 and step 306 can be effectively combined: into a single step for performance considerations.

As an example, if the user had stated that they wanted to "Send an e-mail to John", but domain tables 220 contained a John A, a John B, and a John C, discourse engine 214 would generate separate scores for sending e-mail to John A, John B, and John C. If in the past, the user has sent an equal number of e-mails to John A, John B, and John C, the scores generated by discourse engine 214 and discourse model 216 would be equal for each semantic structure. However, if the user sends e-mail to John A 90% of the time, John B 8% of the time, and John C 2% of the time, the scores generated by discourse model 216 will be heavily weighted toward John A and will be quite low for John B and John C.

In many embodiments, the same mechanisms for resolving semantic ambiguity may be used to resolve recognition ambiguity. For example, when a user says "Send e-mail to John A," a speech recognizer may recognize the utterance as to "John A", "John K", or "John J" based on acoustic and other confounding factors. In many embodiments, the system may choose to view these competing recognition hypotheses as a semantic ambiguity. This treatment eliminates extra handling that would be needed if the recognition ambiguity was resolved before the surface semantic was given to the discourse engine.

The ambiguity resolution can also be extended to semantic contradictions that arise in a multimodal environment in which multiple recognition engines each provide surface semantics that contradict one another. For example, a user says "Send e-mail to John A" but clicks on the picture of "John B" on the display. In many embodiments, the cross modality semantic ambiguity can be treated in the same manner described above without executing special instructions to handle cross-modality conflicts.

At step 308, rendering engine 224 of FIG. 2 receives the discourse semantic structure generated by discourse engine 214 as well as the scores associated with each path through the structure. Rendering engine 224 uses the discourse semantic structure and the associated scores as input to a behavior model 226 which generates the cost of taking particular actions in view of the available user interfaces and the current state of the dialog as represented by the discourse semantic structure.

The cost of different actions can be calculated based on several different factors. For example, since the usability of a dialog system is based in part on the number of questions asked of the user, one cost associated with a dialog strategy is the number of questions that it will ask. Thus, an action that involves asking a series of questions has a higher cost than an action that asks a single question.

A second cost associated with dialog strategies is the likelihood that the user will not respond properly to the question posed to them. This can occur if the user is asked for too much information in a single question or is asked a question that is too broadly worded.

Lastly, the action must be appropriate for available output user interface. Thus, an action that would provide multiple selections to the user would have a high cost when the output interface is a phone because the user must memorize the options when they are presented but would have a low cost when the output interface is a browser because the user can see all of the options at once and refer to them several times before making a selection.

Under the embodiment of FIG. 2, discourse engine 214 provides the available user interfaces to rendering engine 224 from an interface memory 230. Note that in other embodiments, interface memory 230 may be connected directly to rendering engine 224, or rendering engine 224 may access an operating system function to identify the available output interfaces.

When determining the cost of an action, rendering engine 224 and behavior model 226 will consider whether a semantic structure has a high enough score that the rendering engine has a high likelihood of success simply by performing the action associated with the discourse semantic structure. For example, if the user had said "Send this message to John", as in the example noted above, and the score for John A was significantly higher than the scores for John B and John C, the rendering engine will simply send the message to John A without asking for further clarification from the user. In such an instance, the cost of making an error in sending the e-mail to John A would be less than the cost of asking the user to clarify which John they wish to send the e-mail message to. On the other hand, if the cost of making an error in sending the e-mail to John A is high, the proper action would be to generate a confirmation query to the user. In many embodiments, the costs and thresholds can be expressed explicitly in the behavior model 226.

In step 310 of FIG. 3, rending engine 224 selects the highest action score and executes the corresponding action. Often times, this involves sending a response to the user through a user output interface 228.

After rendering engine 224 has selected an action, in some embodiments, it modifies one or more of the language models 210 and 212 so that the language models can be used to properly interpret the user's response to the action. For example, if the rendering engine supplies three alternatives to the user, it can update the language model to associate a phrase such as "the first one", or "the second one" with particular entities. This allows the recognition engine to replace the identified phrases with the particular entities, making it easier for the discourse engine 214 to insert the entities in the proper slot of the discourse semantic structure.

As a further explanation of the operation of the discourse system described in FIGS. 2 and 3, FIGS. 4–12 provide examples of surface semantic structures, and discourse structures for a sample dialog. In the discussion below, tree structures are used for the surface semantic structure and the discourse structure. As noted above, in such structures, the "children" of a node in the tree can be viewed as an attribute of the token at that node. In the discussion below, child nodes are referred to as children and attributes interchangeably. In addition, for the purposes of the discussion below, the recognition engines are assumed to be well-behaved and do not generate results that cause semantic or recognition ambiguities even though these situations can be handled properly in this invention.

The discourse begins with the user saying "Send it to those in the meeting on Wednesday". This phrase is received by a speech recognition engine, which uses a language model to generate the surface semantic structure shown in FIG. 4. The surface semantic structure of FIG. 4 includes a root node 400 containing the semantic token <Send mail>, which is associated with the entire phrase "Send it to those in the meeting on Wednesday". The <Send mail> token has two children nodes, or attributes, 402 and 404 which are identified as semantic tokens <Message> and <Recipient>, respectively. <Message> token 402 is associated with the word "it" and <Recipient> token 404 is associated with the phrase "those in the meeting on Wednesday".

<Recipient> token 404 has a further child node 406 that contains the semantic token <Meeting attendees>, which is associated with the phrase "those in the meeting on Wednesday".

<Meeting attendees> token 406 has an attribute of <Existing meeting>, which is represented by token 408 and is associated with the phrase "meeting on Wednesday". <Existing meeting> token 408 has an attribute 410 that contains the semantic token <Date>, which is associated with the word "Wednesday".

Note that the recognition engine associated with the semantic tree structure of FIG. 4 is only one recognition engine that may be operating on the system. FIG. 5 shows a surface semantic structure produced by a recognition engine operating in parallel with the speech recognition engine. In particular, the surface semantic structure of FIG. 5 is generated by a recognition engine associated with a pointing device. In the present example, the pointing device generates a signal indicating that the user clicked on a particular message while they were saying "Send it to those in the meeting on Wednesday". Based on this clicking gesture, the recognition engine associated with the pointing device generates a single node structure 500 containing a <Message> semantic token that is associated with the message ID of the message clicked on by the user.

The surface semantic structures of FIGS. 4 and 5 are provided to the discourse engine which first tries to expand discourse semantic structures by inserting the current input information into as many nodes as possible. In the current example, this results in a discourse semantic tree as shown in FIG. 6.

Figure 6:
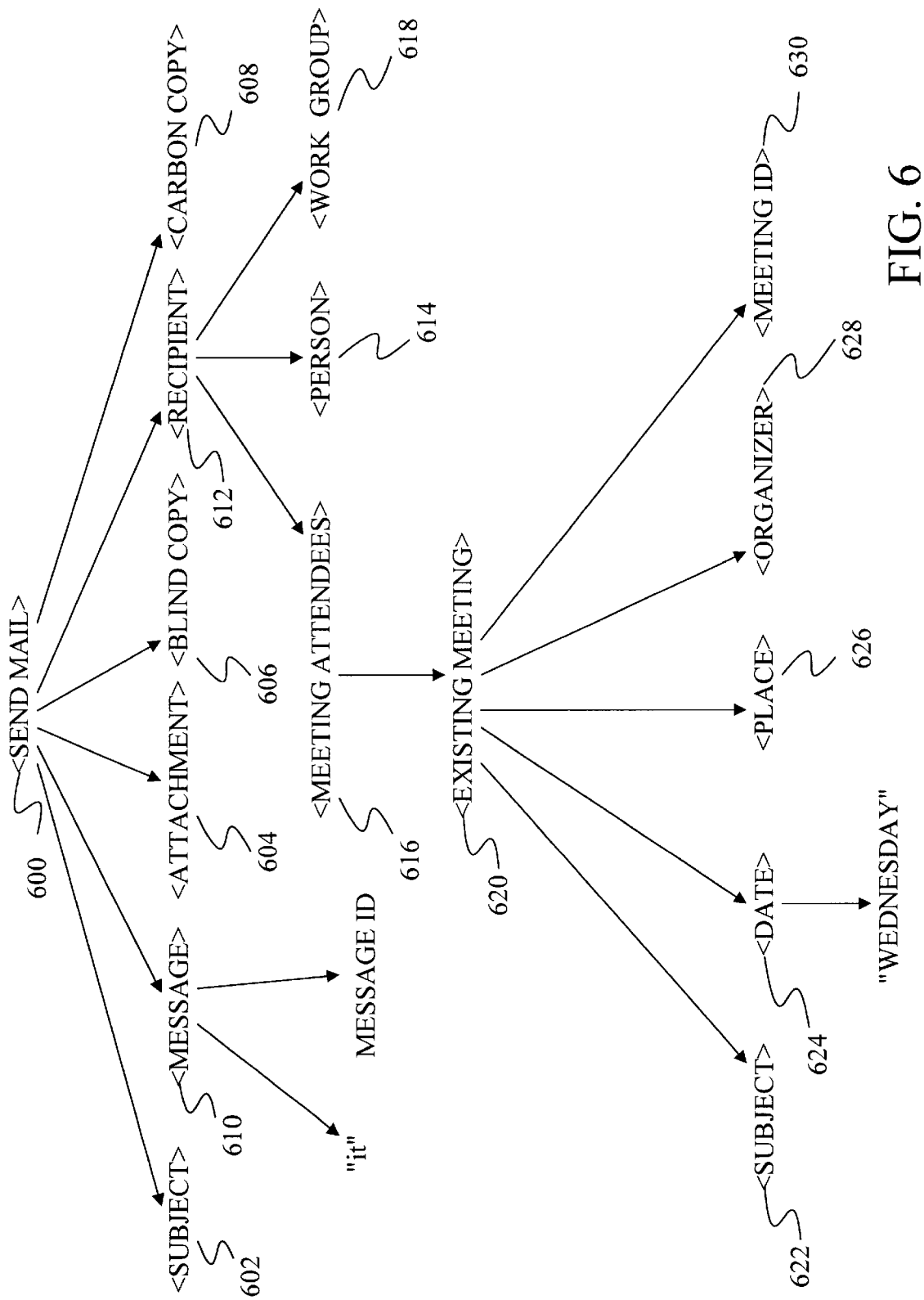
FIG. 6 is a graphical representation of a discourse tree structure generated by a discourse engine of the present invention.

The discourse semantic tree of FIG. 6 includes a root node 600 having a <Send mail> semantic token. <Send mail> token 600 has six attributes, which appear as children nodes 602, 604, 606, 608, 610, and 612, containing semantic tokens of <Subject>, <Attachment>, <Blind copy>, <Carbon copy>, <Message>, and <Recipient>, respectively.

Based on the surface semantic structures of FIGS. 5 and 6, discourse engine 214 has two possible values that can be associated with <Message> token 610. These values are "it" and the message ID returned by the pointing device recognition engine.

<Recipient> node 612 points to further possible recipient types including <Person> token 614, <Meeting attendees> token 616 and <Work group> token 618. Of these three tokens, only <Meeting attendees> 616 has been further expanded to include a child node of <Existing meeting> 620.

<Existing meeting> token 620 represents an existing meeting in a database. Such existing meetings can be referred to by subject, date, the place of the meeting, the organizer of the meeting, or the meeting ID. Each of these attributes is shown as a separate token 622, 624, 626, 628, and 630, respectively. Based on the surface semantics, the discourse engine is able to associate a value of "Wednesday" with <Date> token 624. However, the surface semantics did not provide values for the other attributes of <Existing meeting> token 620.

Although all the attributes are shown for each semantic token of FIG. 6, even though the attributes are not filled, in other embodiments, these attributes would not be included as nodes for the discourse structure until a surface semantic indicated that they should be added to the larger discourse tree.

Figure 7:
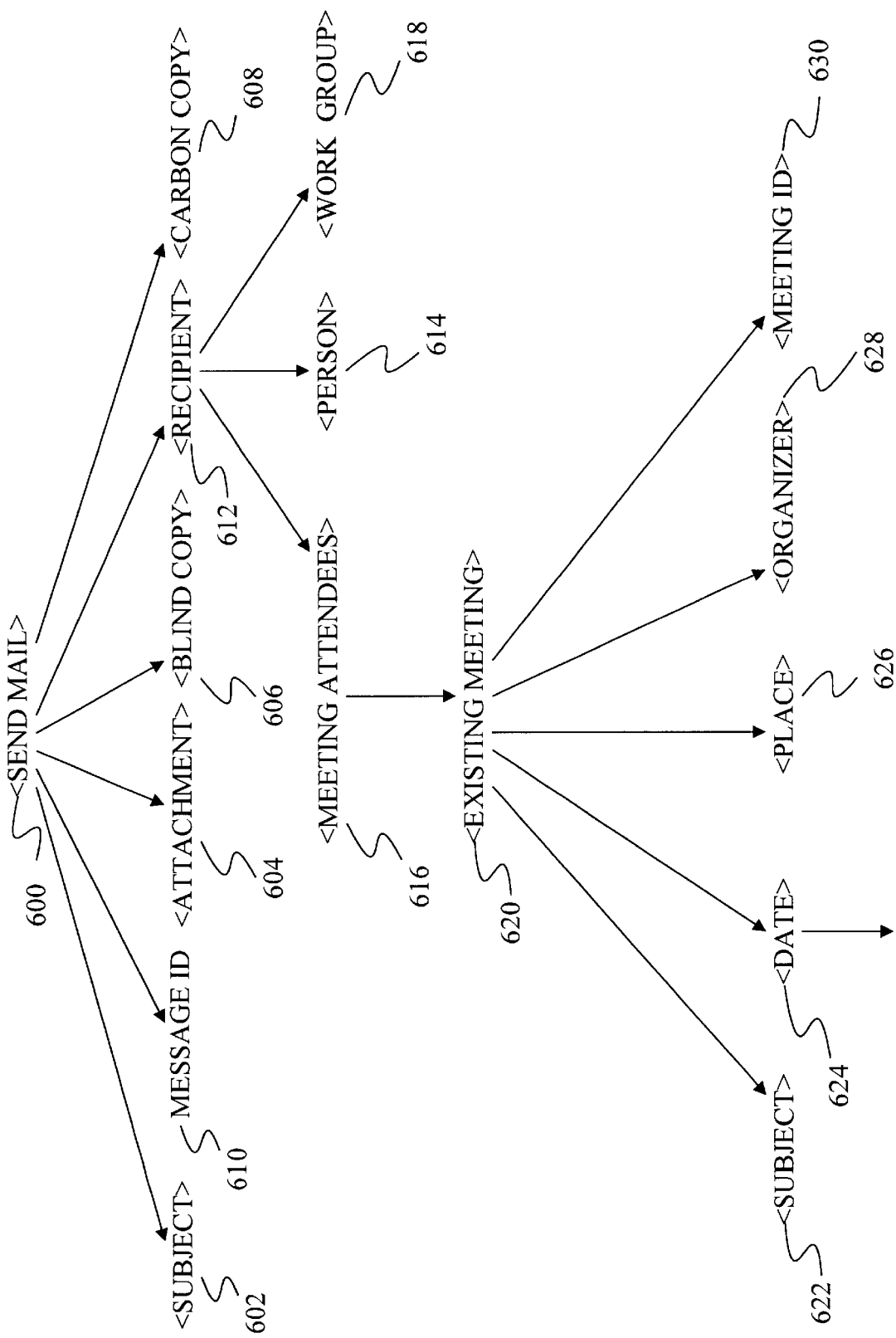
FIG. 7 is the discourse tree of FIG. 6 showing the message node after it has been collapsed.

After expanding the discourse semantic tree, the discourse engine then attempts to collapse the tree as much as possible. Using the tree of FIG. 6, discourse engine 214 is able to collapse <Message>token 610 by first resolving the indirect reference "it" into the direct and explicit reference of message ID and then confirming: through the domain experts that there is only one message with this message ID. Thus, the generalized <Message> token 610 is replaced by the specific message ID entity, as shown in FIG. 7.

Discourse engine 214 then attempts to collapse the lowest node on the recipient branch of the discourse structure. This involves attempting to collapse <Existing meeting> token 620. To do this, the discourse engine uses a meeting domain expert 222 to search domain tables 220 for an existing meeting that has the attributes attached to <Existing meeting> token 620. In the example of FIG. 6 this involves searching the database for a meeting that occurred on a Wednesday. If there is only one meeting that occurred on a Wednesday, <Existing meeting> token 620 is replaced by the identification number for that meeting.

Figure 8:
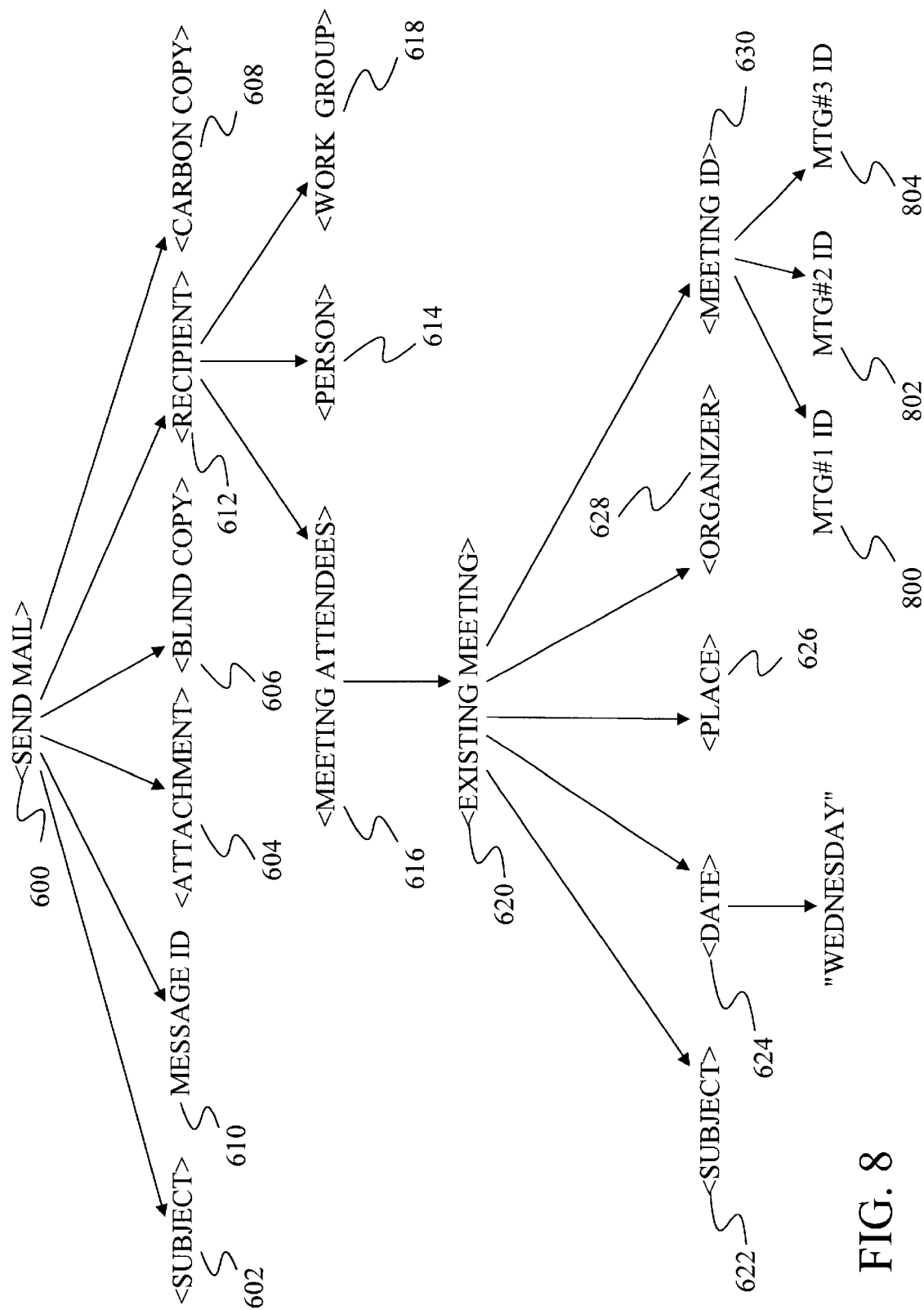
FIG. 8 is the discourse tree of FIG. 7 showing an expansion of the discourse tree to include meeting entries found in a domain table.
Figure 10:
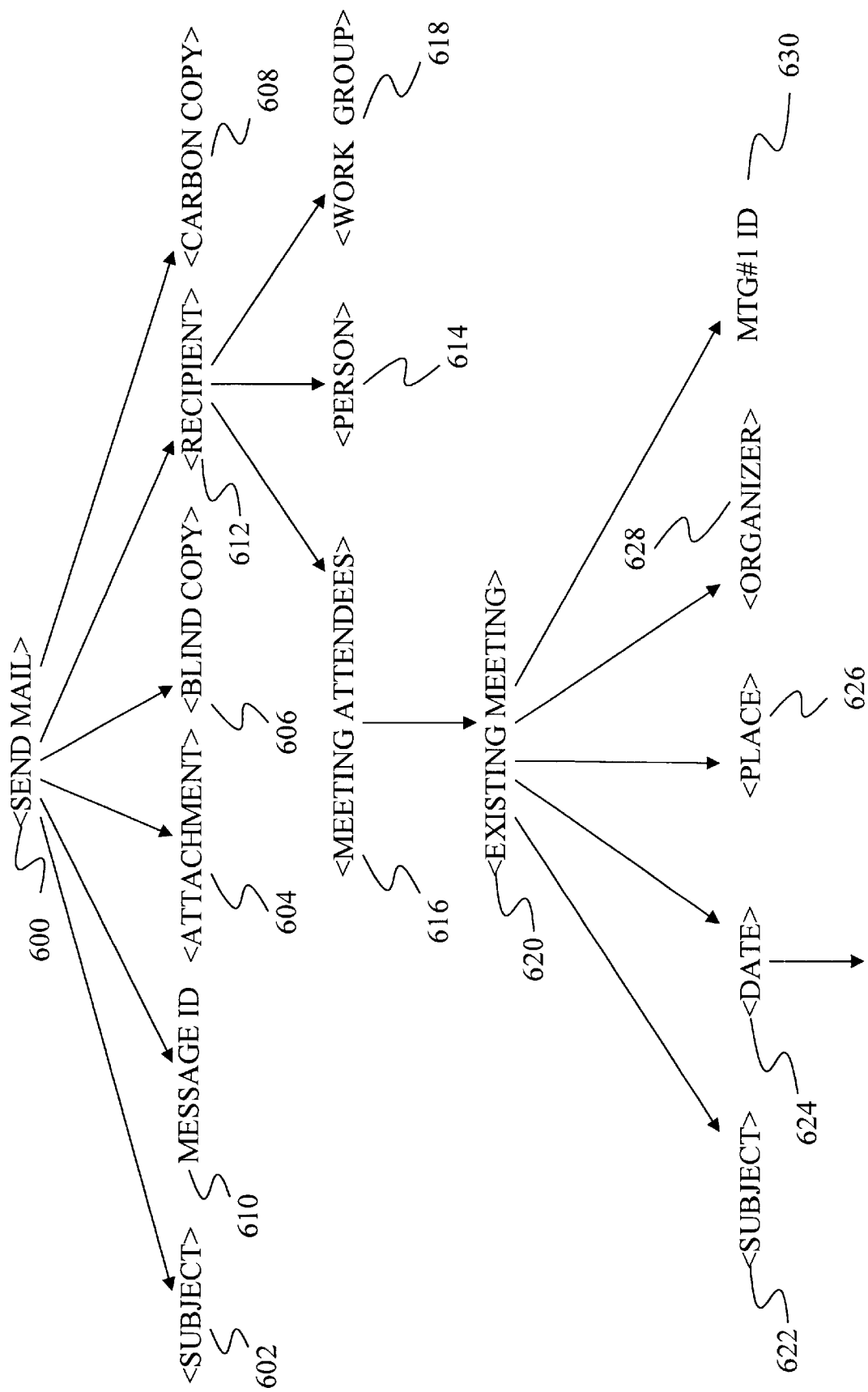
FIG. 10 is the discourse tree of FIG. 8 after the existing meeting node has been collapsed in response to the user's answer.

If, however, there is more than one meeting that occurred on a Wednesday, the domain expert returns all of the meetings that match the search criteria. Discourse engine 214 adds these meetings as possible values for <Meeting ID> token 630. This is shown in FIG. 8 with alternatives 800, 802, and 804 extending from <Meeting ID> token 630.

Since existing meeting 620 cannot be collapsed, discourse engine 214 then uses discourse model 216 to determine a probability that the user wishes to send mail to attendees of each of the three possible meetings 800, 802 and 804. Thus, discourse engine 214 generates three separate scores for the <Send mail> root node.

If, based on the discourse model, none of the structures associated with the possible meetings has a high enough score to make asking a refining question more costly than sending an e-mail, rendering engine 224 asks a question of the user to clarify which of the meetings the user was referring to. Under one embodiment, rendering engine 224 will also update the language model to accept input such as "the first one" or the "the second one" so that such input can be associated with a particular meeting based on how the rendering engine provides the options to the user.

After the user has been asked the meeting refinement question, the speech recognition engine receives the phrase "the first one" from the user. Based on the modified language model, the recognition engine is able to convert this input into a surface semantic structure having a root token of <Meeting> that is associated with the identification number of the first meeting. Such a surface semantic structure is shown in FIG. 9.

Based on this new surface semantic structure, discourse engine 214 once again attempts to expand the send mail discourse structure. In this case, the information provided is an entity for the <Meeting ID> token, which is thus associated with the <Meeting ID> token.

After this small expansion, discourse engine 214 attempts to collapse as many nodes as possible of the send mail discourse structure. The first node to be collapsed is the <Meeting ID> token. This is done simply by replacing the token with the meeting ID that was associated with it during the expansion.

Next, discourse engine 214 attempts to collapse the <Existing meeting> token. Since the <Meeting ID>attribute of the <Existing meeting> token has been replaced by a meeting ID entity, the <Existing meeting> token can be collapsed by replacing the <Existing meeting> token with the meeting ID.

Figure 11:
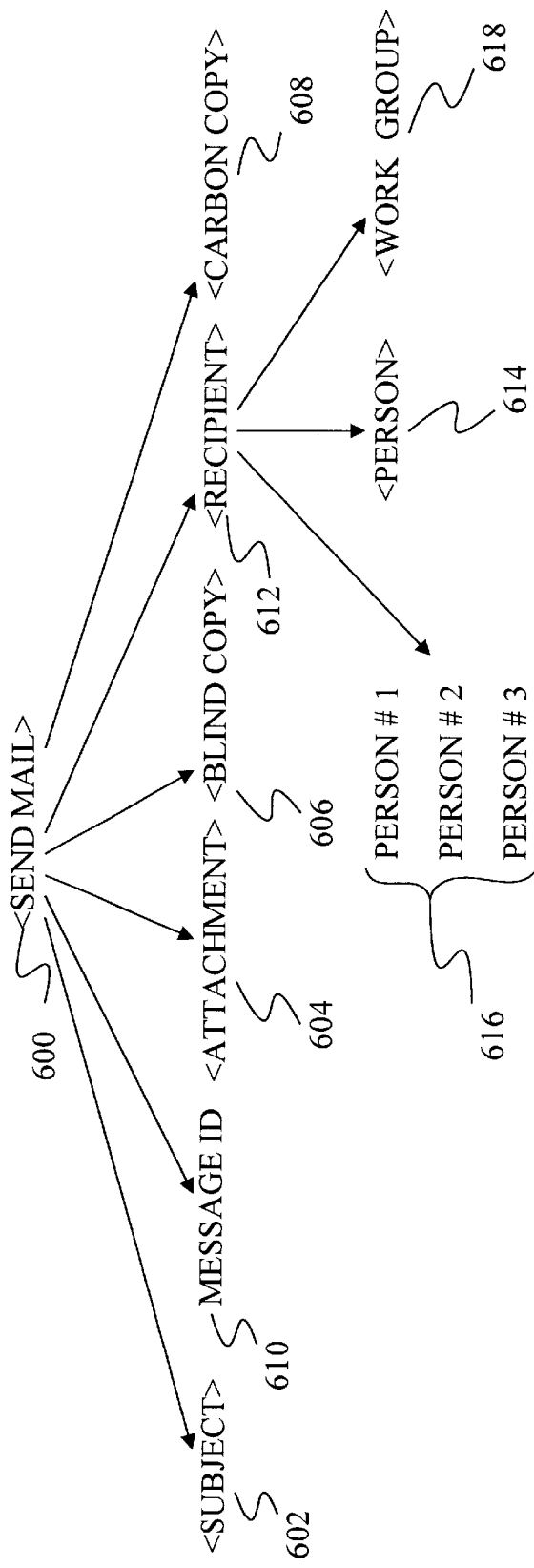
FIG. 11 is the discourse tree of FIG. 10 after the meeting attendees node has been collapsed.

The next token that can be collapsed is <Meeting Attendees> token 618. To collapse this token, discourse engine 214 passes the meeting ID to the domain experts which search the appropriate domain table to identify the people who attended the meeting associated with that meeting ID. The domain experts then return the identification of each of the people who attended the meeting. The identifications for these people are then put in place of the <Meeting attendees> token as shown in FIG. 11.

Discourse engine 214 then attempts to collapse the <Recipient> token based on the people listed below it. To do this, discourse engine 214 passes the identifications for these people to the domain experts, which search the appropriate domain table to identify whether these people have e-mail addresses. If these people have e-mail addresses, the e-mail addresses are returned by the domain experts. The e-mail addresses are then put in place of the <Recipient> token. This is shown in FIG. 12.

At this stage, discourse engine 214 uses the discourse model to attribute a score to the entire send mail discourse structure. This score will take into account both the recognition score associated with the input used to generate the send mail discourse structure, as well as the likelihood that the user would want to send mail. Note also that the discourse model attributes a higher score to discourse structures that have little ambiguity. In this case, since both the recipients and a message to send have been identified, the send mail discourse structure has a very high probability since it is likely that the user intends to send this message ID to the e-mail addresses listed in the send mail discourse structure of FIG. 12.

Figure 12:
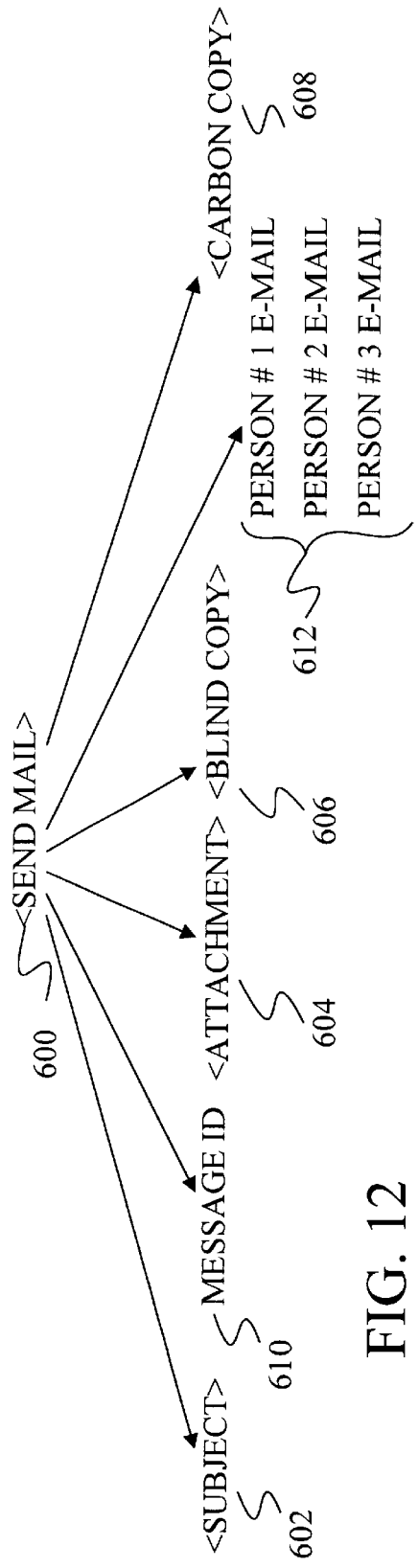
FIG. 12 is the discourse tree of FIG. 11 after the recipients node has been collapsed.

The discourse structure of FIG. 12 and its related probabilities are passed to the rendering engine which uses the behavior model to determine whether the probability is high enough to execute the action represented by the send mail discourse structure. Since the send mail discourse structure is fully collapsed, it is very likely that the rendering engine will send the e-mail.

As described above, each of the subsystems of the present dialog system use stochastic models to perform pattern recognition. Thus, recognition engine 206 uses language model 210 to identify probabilities for various different surface semantic structures. This can be represented mathematically as $P(F|x)$ where x is the user input, F is the identified surface semantic structure, and $P(F|x)$ is the probability of a surface semantic structure given the user input.

Similarly, the discourse engine uses a discourse model to produce scores for each of a set of possible discourse structures. Generically, the discourse engine can be thought of as providing the probability of a current dialog state given a previous dialog state and the surface semantic structure. In terms of a mathematical representation, this would appear as $P(S_n|F, S_{n-1})$ where $S_n$ is the current dialog state, F is the current surface semantic structure, $S_{n-1}$ is the previous dialog state, and $P(S_n|F, S_{n-1})$ is the probability of the current dialog state given the current surface semantic structure and the previous dialog state. Note that in this context, the previous dialog state includes the discourse memory and any discourse structures that had been opened by the discourse engine.

Thus, taken together, recognition engine 206, language model 210, discourse engine 214 and discourse model 216 represent a dialog state engine that identifies a score for a possible current dialog state based on the user input and a past dialog state. Those skilled in the art will recognize that although the dialog state engine has been described as containing two smaller engines, in other embodiments, the dialog state engine is implemented as a single engine that uses a single model.

Under the present invention, rendering engine 224 also utilizes a stochastic model, represented by behavior model 226. Specifically, rendering engine 224 determines the lowest cost action given the current dialog state. This can be represented as determining the probability of each action given the current dialog state or mathematically as $P(A|S_n)$ where A is an action and $S_n$ is a current dialog state.

Because each element of the dialog system under the present invention uses a stochastic model, the actions of the dialog system can be represented as a single stochastic model. In terms of a mathematical equation, the function of the dialog system can be represented as $$A_{opt} = \arg\max_A P(A|x\ S_{n-1}) \qquad \text{EQ.1}$$

where $A_{opt}$ is the optimum action to be taken, and $P(A|x, S_{n-1})$ is the probability of an action, A, given a user input, x, and a previous dialog state, $S_{n-1}$.

The overall probability given by equation 1 can be broken down further into the individual probabilities associated with the recognition engine, the discourse engine, and the rendering engine. This produces:

$$A_{opt}=\arg\max_{A}\Sigma_{S}\ P(A|S_{n})\Sigma_{F}P(S_{n}|F,S_{n-1})P(F|x) \qquad \text{EQ.2}$$

where $P(A|S_n)$ is the probability generated by the rendering engine, $P(S_n|F, S_{n-1})$ is the probability generated by the discourse engine, and $P(F|x)$ is the probability generated by the recognition engine. Using the Viterbi approximation, Equation 2 can be further simplified to:

$$A_{opt}=\arg\max_{A,S}P(A|S_{n})\Sigma_{F}P(S_{n}|F,S_{n-1})P(F|x) \qquad \text{EQ.3}$$

where the Viterbi approximation selects the largest probability in the rendering engine to represent the sum of the probabilities for all of the possible actions.

The ability to represent the entire system performance in a single mathematical equation makes it easier to optimize the present system. Theoretically and empirically, this has been shown to provide a more efficient means for training the system as a whole and for integrating the various sub-systems to produce the single system. Furthermore, the separate probabilities associated with each sub-system provide a means for forming the sub-systems into modular units such that the exact function of each modular unit is not important as long as the modular unit gives a score for an expected output structure when given a set of input values.

Figure 13:
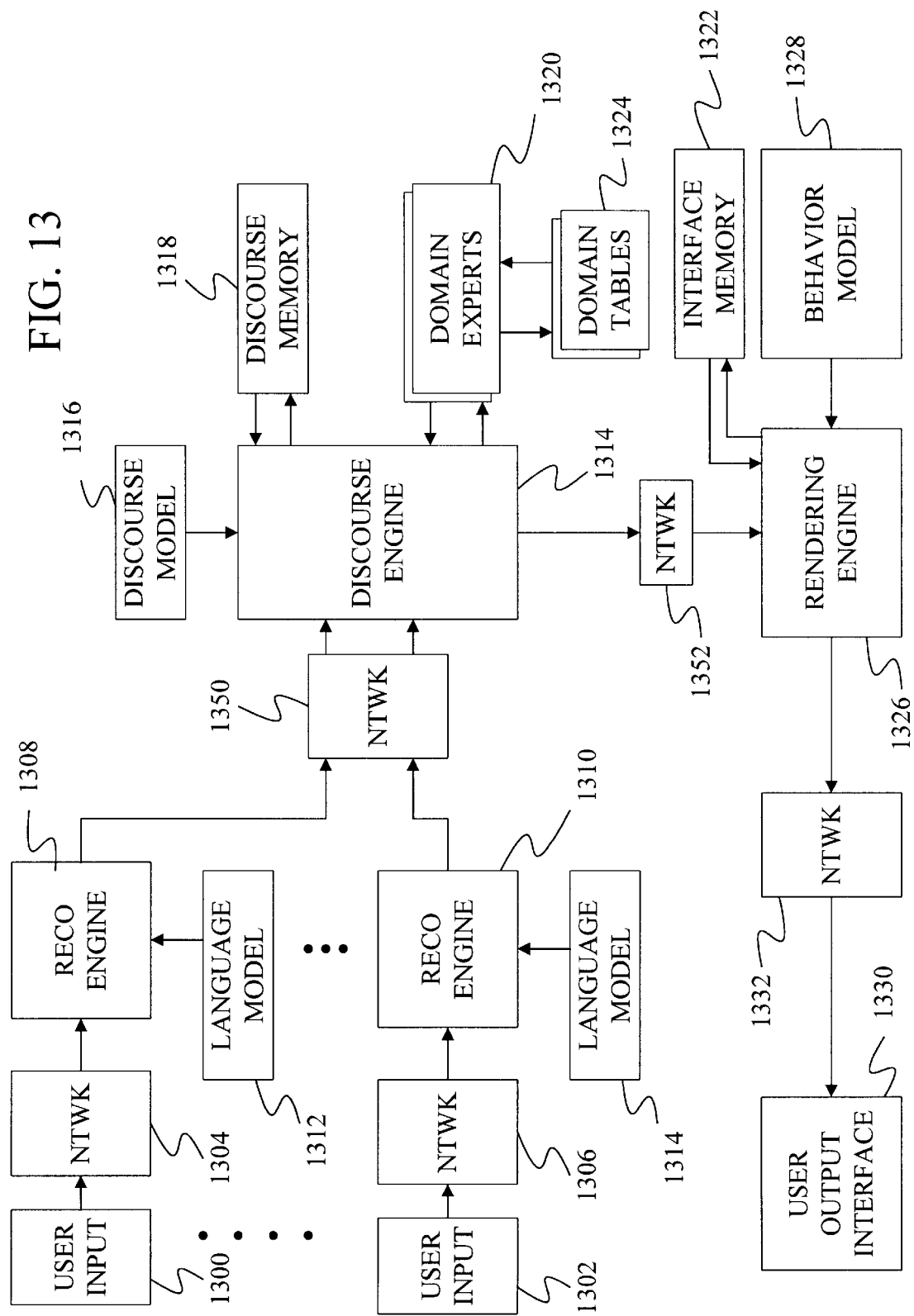
FIG. 13 is a block diagram of a second embodiment of the dialog system of the present invention.
Figure 14:
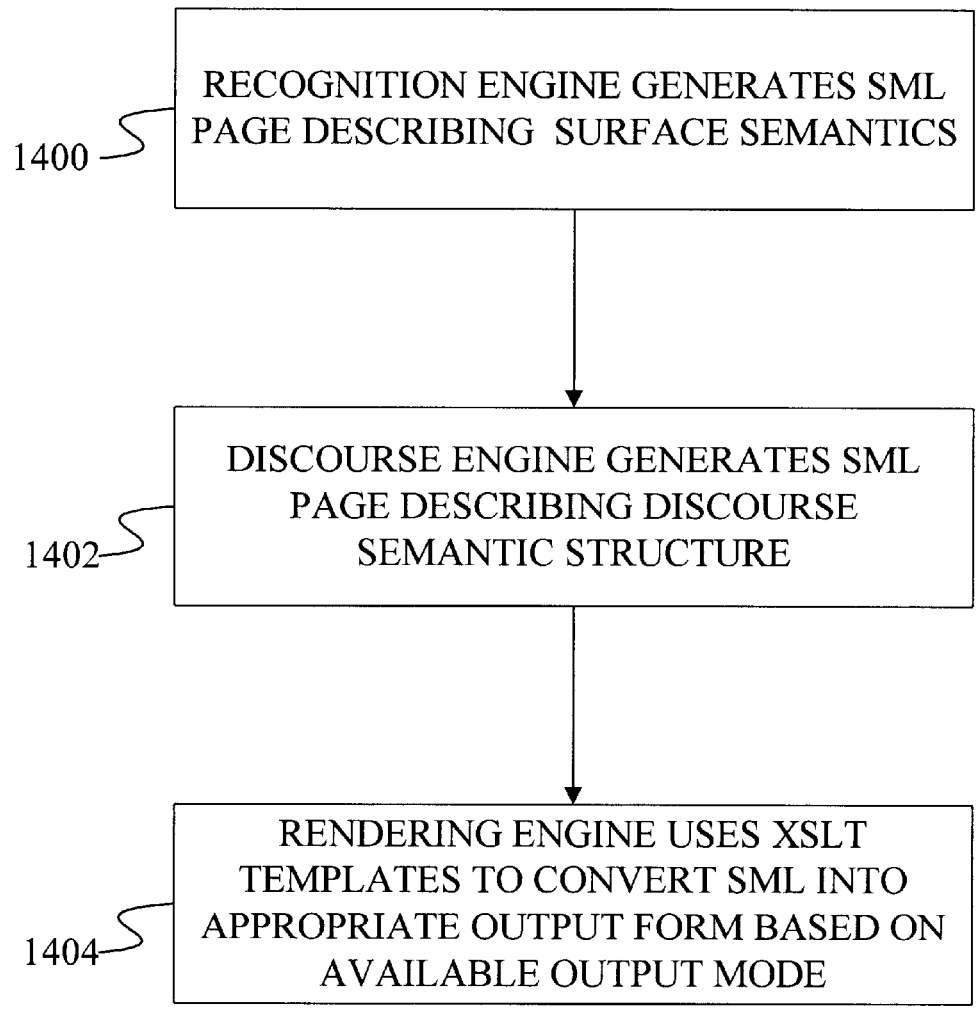
FIG. 14 is a flow diagram of a mark-up language based embodiment of a dialog system under the present invention.

FIG. 13 provides a block diagram of a second embodiment of the present invention that may be practiced across a distributed computing environment. FIG. 14 provides a flow diagram of a dialog method using the embodiment of FIG. 13.

In FIG. 13, the user provides input through one or more user input interfaces represented by interfaces 1300 and 1302. The user input can be transmitted across networks such as the Internet or an intranet as shown by networks 1304 and 1306. The input may be transmitted according to any one of a variety of known network protocols including HTTP and FTP. In particular, speech input from the user may be sent as a wave file, or as a collection of feature vectors. User input may also be transmitted in an extensible markup language (XML) format.

At step 1400 of FIG. 14, recognition engines 1308 and 1310 use language models 1312 and 1314 to identify a most likely set of surface semantics based on the user input. Under this embodiment of the invention, language models 1312 and 1314 are authored in the extensible mark-up language (XML) format. Under this XML format, the different surface semantic objects are represented as tags in the XML page and the hierarchy of the semantic objects is represented by the hierarchy found in the XML nested tags.

The tags from the language model that are associated with the user input by the recognition engine are placed into a separate XML description page that conveys the surface semantics. Under one embodiment, a mark-up language, referred to as a semantic mark-up language or SML, is extended from XML to represent the surface semantics. . Under this embodiment, the output of recognition engines 1308 and 1310 is a semantic mark-up language page. For example, the surface SML for an utterance "what is the phone number for Kuansan?" is:

<DirectoryQuery . . . >
      <PersonByName type="Person" parse="Kuansan">
        kuansan
      </PersonByName>
      <DirectoryItem type="DirectoryItem" parse="phone number" confidence="65">
      </DirectoryItem>
    </DirectoryQuery>

In this example, DirectoryQuery represents the root node of the surface semantics indicating what the basic type of intention found in the utterance. PersonByName indicates that there is a person explicitly referred to in the utterance and DirectoryItem indicates that the user is looking for a directory item.

In many embodiments, the instructions to generate valid SML pages are dynamically synthesized and embedded in the language model. In most embodiments the instructions to generate valid SML pages follow an extensible stylesheet language transformations (XSLT) standard set by the World-wide Web Consortium. The XSLT standard consists of two integrated portions: matching the source document and generating the transformed document. For user inputs that are formatted as XML pages, both portions of the standard are used by the language model. However, for user input that is not formatted as XML pages, such as wave files, straight text or feature vectors, only the standard for generating transformed documents can be used.

In the SML page, the recognition scores are tagged to the SML nodes as XML attributes. One example of passing the confidence measure on the DirectoryItem is shown above. In some embodiments, the scores of acoustic models and language models are attached in the same fashion.

The SML pages generated by recognition engines 1308 and 1310 are passed to the discourse engine 1314. Under the embodiment of FIG. 13, discourse engine 1314 may be located on the same machine as the recognition engines or may be located on a remote machine, in which case the SML pages are transmitted through a network, such as network 1350 of FIG. 13, to the discourse engine.

At step 1402 of FIG. 14, discourse engine 1314 uses a discourse model 1316 to convert the surface semantic SML page into a discourse semantic SML page. Under one embodiment of the invention, this is done using a specialized XML to specify the discourse model. In particular, the discourse model is written in a semantic definition language (SDL) which defines the legitimate constructs of a SML document and specifies the relationships among the semantic objects found in the surface semantics and the discourse semantics. Using SDL to define the mark-up language schema for SML allows the system to dynamically adjust the schema for SML, and eliminates the need for a separate SML schema specification in either the Document Type Definition or the XML Schema format. The SDL pages of the model also provide semantic inference rules that discourse engine 1314 utilizes to expand and contract the discourse structures. This includes the rules for accessing the discourse memory 1318, and the domain experts 1320. Note that under this invention, the discourse memory 1318, the domain experts 1320, and the domain tables 1324 operate in a manner similar to the manner described for similarly named items in FIG. 2 above. The rules provided in the SDL of discourse model 1316 also provide for generating scores for the various discourse semantics and for selecting a particular discourse semantic to provide to a rendering engine 1326.

Continuing the example of the surface semantic described above, the output of the discourse engine would be an SML page containing:

<DirectoryQuery . . . >
      <Person id="kuansanw" parse="kuansan" score="99">
        <First>Kuansan</First>
        <Last>Wang</Last> . . .

```
    </Person>
    <DirectoryItem parse="phone number" score="45">
        <phone>+1(425)703-8377</phone>
    </DirectoryItem>
</DirectoryQuery>
```

In this SML page, it can be seen that the discourse engine has resolved the phone number to a number entity and has resolved the reference to Kuansan to a particular person Kuansan Wang.

The SML pages provided by discourse engine 1314 are also decorated with inference scores as shown above. Although the examples above only demonstrate well-behaved recognition and understanding, those skilled in the art will appreciate the XML-compliant nature of SML possesses sufficient expressive power in annotating recognition and semantic ambiguities as they arise.

The SML pages generated by discourse engine 1314 are provided to rendering engine 1326. In some embodiments, the two engines are located on different computers and are connected by a network such as network 1352 of FIG. 13.

At step 1404 of FIG. 14, rendering engine 1326 converts the SML pages it receives into an appropriate action. Initially, the XML pages received by rendering engine 1326 are applied to a behavior model 1328. Under one embodiment of the present invention, behavior model 1328 is designed using an extensible stylesheet language (XSL) and in particular is designed using XSL-transformations (XSLT). Using the XSLT standard, the behavior model can transform the SML structures into another mark-up language, say for example hypertext mark-up language (html), wireless mark-up language (wml) or a text-to-speech (tts) mark-up language. Thus, behavioral model 1328 includes rules for converting specific SML structures produced by the discourse engine into actions that are embedded within an appropriate output page such as an html page, a wml page, or some other output.

In other embodiments, the behavior model is only able to use the document matching portion of the XSLT standard and not the document generation portion. This occurs when the action to be taken does not involve the production of a markup language page, for example, when the action is a system command. In such cases, the behavior model performs the matching function and then determines the best means to generate the appropriate action.

Thus, the output of the behavior model can be action pages that include things like scripts that ask the user clarifying questions, or system commands that take specific actions. Thus, rendering engine 1326 selects an appropriate action in a manner similar to the way in which the rendering engine of FIG. 2 selects an appropriate action.

An example of an XSLT section appropriate for producing text-to-speech actions of the SML text described above is:

```
<xsl:template match="DirectoryQuery[@not(status)]">
    For <xsl:apply-templates select="Person"/>, the
    <xsl:apply-templates select="DirectoryItem"/>
</xsl:template>
<xsl:template match="Person">
    <xsl:value-of select="First"/>
    >xsl:value-of select="Last"/>
</xsl:template>
<xsl:template match="DirectoryItem">
    <xsl:apply-templates/>
</xsl:template>
<xsl:template match="phone">
    phone number is <xsl:value-of/>
<xsl:template>
```

This XSLT text leads to a response provided to the user "For Kuansan Wang, the phone number is +1(425) 703-8377." which would be provided as an audio signal to the user. Those skilled in the art will appreciate that advanced text to speech mark-up, such as prosodic manipulation, can be easily added to the above example. The behavior model could alternatively select an XSLT stylesheet to render the response as an html table. An example of a stylesheet that would produce such a table is shown below:

```
<xsl:template match="DirectoryQuery[@not(status)]">
    <TABLE border="1">
        <THEAD><TR>
            <TH>Properties</TH>
            <TH><xsl:apply-templates select="Person"/></TH>
        </TR></THEAD>
        <TBODY><xsl:apply-templates select=
            "DirectoryItem"/>
        </TBODY>
    </TABLE>
</xsl:template>
<xsl:template match="phone">
    <TR><TD>phone</TD><TD><xsl:value-of /></TD></TR>
</xsl:template>
```

Note that the rendering engine can select the appropriate stylesheet template dynamically based on interface information in interface memory 1322 and the tags in the SML document describing the discourse semantic structure.

The SML discourse page provided by the discourse engine can include cues to help rendering engine 1326 determine what action to take. For example, if a query is for a person named "Derek" and there are 27 matches in the database, the discourse SML page looks like:

```
<DirectoryQuery status="TBD" focus="Person" . . . >
    <PersonByName type="Person" parse="Derek"
        status="TBD" . . .>
        <error scode="1" count="27"/>
        <Person id="derekba">
            <First>Derek</First>
            <Last>Bevan</Last>
            . . .
        </Person>
        <Person id="dbevan">
            <First>Derek</First>
            <Last>Bevan</Last>
            . . .
        </Person>
        . . .
    </PersonByName>
    . . .
<DirectoryQuery>
```

In this example, semantic objects that could not be collapsed by the discourse engine such as DirectoryQuery and PersonByName in the above example, are flagged with a status of to-be-determined "TBD". The discourse SML also marks the current focus of the dialog to indicate the places where the semantic evaluation is continued. For example, in the DirectoryQuery tag, the focus attribute is set equal to person indicating that the person associated with the directory query has not been resolved yet. These two cues assist the behavioral model in choosing an appropriate response i.e. an appropriate XSLT stylesheet.

In this example, the behavior model could select an XSLT stylesheet that produces an html page to present all of the 27 possibilities on a display. However, this would only be appropriate if the user had a full-scale browser available to them. If such a browser were not available to the user, the system could alternatively use a text-based stylesheet. However, such a stylesheet may require a more elaborate dialog strategy that would be based on several dialog turns in which the user is asked a sequence of questions to resolve the ambiguity.

The action determined by behavior model 1328 is implemented by rendering engine 1326, often resulting in an output to a user output interface 1330. This output may be passed directly to the user output interface or may pass through an intermediate network 1332.

One aspect of this embodiment of the invention is that the user is able to switch their user interface in the middle of a dialog session. To do this, the user communicates that they wish to switch to a new user interface. Discourse engine 1314 passes this interface information to rendering engine 1326 as the latest discourse semantic SML page. The behavioral model converts this SML page into an action that updates interface memory 1322 to reflect the newly selected interface. This new interface is then used by rendering engine 1326 to select the proper stylesheets for future SML pages so that the SML pages are converted into an output format that is appropriate for the new interface.

Note that under this system, the discourse semantic structure for the discourse itself does not change. As such, discourse engine 1314 does not need to be recoded or have its operation changed in any manner when the user changes the output interface. This makes it easier to adapt to new user output interfaces as they become available.

Since the dialog strategy is encoded in the XSLT that can be dynamically swapped, the system also exhibits tremendous amount of flexibility for dialog designers to dynamically adapt dialog strategies. For example, when the system encounters an experienced user, the behavior model can choose to apply a stylesheet that lets the user to decide dialog flow most of the time. When confusions arise, however, the behavior model can decide to roll back to a "system-initiative" dialog style in which the human user is asked to comply with more rigid steps. Changing dialog styles in the middle of dialog sessions amount to applying different stylesheets and requires no changes in the language or discourse models for the rest of the system.

One reason that XSLT has not been applied to dialog applications is that XSLT has no memory state. As such, the behavior model and the rendering engine in the embodiment of FIG. 13 are unable to store the past state of the dialog. Under the embodiment of FIG. 13, this does not represent a problem since discourse engine 1314 can manage and store the past states of the dialog. Discourse engine 1314 then passes any memory elements that are needed by rendering engine 1326 and behavioral model 1328 through the discourse semantic structure of the SML page.

Although the present invention has been described with reference to preferred embodiments, workers skilled in the art will recognize that changes may be made in form and detail without departing from the spirit and scope of the invention. In particular, although the invention has been described above with reference to tree structures, any suitable data structure may be used and the invention is not limited to a tree-based structure.

In addition, although the embodiments described above utilize a discourse semantic engine and discourse model, in other embodiments, these elements are not included. In such embodiments, the surface semantics are provided directly to the rendering engine, which then selects an action by applying the surface semantics directly to the behavior model. In such embodiments, the behavior model determines the costs of the actions based on the surface semantic alone, without reference to a dialog state.

What is claimed is:

1. A method of providing a dialog interface in a computer system, the method comprising:

receiving user input;

applying the user input to a language model to determine a score for at least one surface semantic that describes the content of the user input;

applying a surface semantic to a discourse model to determine a score for at least one discourse semantic that describes the current state of a dialog with the user;

applying a discourse semantic to a behavior model to determine a score for at least one action to be taken by the computer system; and taking an action based in part on the score provided by the discourse model and based in part on the score provided by the behavior model.

2. The method of claim 1 further comprising:

receiving multiple modes of user input;

applying each mode of user input to a language model provided for that mode of user input; and determining a score for at least one surface semantic for each mode of user input that is received.

3. The method of claim 1 wherein applying a surface semantic to a discourse model comprises expanding a discourse semantic structure by placing values in slots of the discourse semantic structure based on the surface semantic.

4. The method of claim 3 wherein expanding the discourse semantic structure further comprises:

accessing a discourse memory to retrieve an explicit value for an implicit reference in the surface semantic; and placing the explicit value in a slot in the discourse semantic structure.

5. The method of claim 4 wherein accessing a discourse memory comprises accessing a discourse memory comprising:

a long-term memory having values resolved from previous user input;

an explicit memory having explicit values found in a current user input; and an implicit memory having values resolved from an implicit reference in the current user input.

6. The method of claim 5 wherein accessing a discourse memory comprises accessing the explicit memory first, the long-term memory second and the implicit memory last.

7. The method of claim 3 wherein applying a surface semantic to a discourse model further comprises after expanding a discourse semantic structure determining if a semantic token in the discourse semantic structure can be replaced by an entity.

8. The method of claim 7 wherein determining if a semantic token in the discourse semantic structure can be replaced by an entity comprise s searching for an entity in a database based on attributes found in the discourse structure for the semantic token.

9. The method of claim 8 wherein determining if a semantic token in the discourse semantic structure can be replaced by an entity further comprises determining that the semantic token can be replaced by an entity if only one entity is found during the search of the database.

10. The method of claim 8 wherein determining if a semantic token in the discourse semantic structure can be replaced by an entity further comprises determining that the semantic token cannot be replaced by an entity if multiple entities are found during the search of the database.

11. The method of claim 10 wherein applying a surface semantic to a discourse model further comprises:
retrieving multiple entities from a database as possible replacements for a discourse semantic token;
adding the multiple entities as children of the discourse semantic token to form separate discourse semantic structures for each entity; and
determining a score for each discourse semantic structure associated with each entity.

12. The method of claim 1 wherein determining a score for at least one action comprises determining a score for an action of:
selecting one of multiple entities in a discourse semantic structure for a discourse semantic token; and
executing a command without asking the user to clarify which entity is correct for the semantic token.

13. The method of claim 12 wherein taking an action based in part on a score provided by the behavior model comprises taking the action of executing the command without asking the user to clarify which entity is correct for the semantic token.

14. The method of claim 1 wherein determining a score for at least one action further comprises applying an identity of an available user interface to the behavior model such that actions that are compatible with the available user interface receive generally higher scores than actions that are not compatible with the user interface.

15. The method of claim 1 wherein applying the user input to a language model further comprises describing the surface semantic using a markup language.

16. The method of claim 15 wherein applying a surface semantic to a discourse model further comprises describing a discourse semantic using a markup language.

17. The method of claim 16 further comprising applying a discourse semantic to a behavior model by converting the discourse semantic into an action described using a markup language.

18. The method of claim 17 wherein converting the discourse semantic comprises selecting a markup language for the action based on an available user interface.

19. The method of claim 18 wherein describing a discourse semantic using a markup language comprises describing the discourse semantic using an extensible markup language and wherein converting the discourse semantic comprises applying the discourse semantic to an extensible stylesheet language transformation.

20. The method of claim 19 further comprising:
receiving an instruction from a user to change the available user interface; and
applying the discourse semantic to a second extensible stylesheet language transformation to convert the discourse semantic into an action described using a second markup language.

21. A system for providing a computer-based dialog interface to a user, the system comprising:
a dialog state engine that receives input from the user and that uses at least one model to generate at least one score for a current dialog state that is represented by a discourse semantic structure comprising semantic tokens that provide a general representation of specific entities, the score being based on the user's input and a previous dialog state, the dialog state engine comprising:
a recognition engine that uses a model to determine a score for at least one surface semantic based on the user input;
a discourse engine that uses a model to determine a score for at least one current dialog state based on the surface semantic from the recognition engine and a previous dialog state, the discourse engine expanding the discourse semantic structure based on the surface semantic and attempting to collapse a portion of the discourse semantic structure before using the model to determine a score for the discourse semantic structure; and
a database containing specific entities that are represented by the semantic tokens; and
a rendering engine that uses a model to identify a score for at least one action based on a current dialog state.

22. The system of claim 21 wherein the discourse engine attempts to collapse a portion of the discourse semantic structure by looking for entities in the database that have the same attributes associated with one of the semantic tokens.

23. The system of claim 22 wherein if more than one entity has the same attributes associated with one of the semantic tokens, the discourse engine adds the entities to the discourse semantic structure below the semantic token, identifies a separate discourse semantic structure for each entity and generates a separate score for the separate discourse semantic structure associate with each entity.

24. A system for providing a computer-based dialog interface to a user, the system comprising:
a dialog state engine that receives input from the user and that uses at least one model to generate at least one score for a current dialog state based on the user's input and a previous dialog state, wherein the dialog state engine describes the current dialog state using a markup language; and
a rendering engine that uses a model to identify a score for at least one action based on a current dialog state and that converts the markup language describing the current dialog state into a second markup language that describes an action.

25. The system of claim 24 wherein the current dialog state is described using an extensible markup language and wherein the rendering engine utilizes extensible stylesheet language transformations to transform the extensible markup language into the second markup language.

26. The system of claim 25 wherein the dialog state engine further receives an indication from the user that they wish to change the output interface, and wherein the rendering engine changes the extensible stylesheet language transformation based on the change of the output interface so that the same extensible markup language description of the current dialog state is converted into a third markup language different from the second markup language.

27. A method of providing a dialog interface, the method comprising:
receiving input generated by a user;
determining a current dialog state based on the received input and a past dialog state;
formatting the current dialog state into an extensible markup language page;
converting the markup language page into an output markup language page based on the current dialog state and an available output user interface by applying the extensible markup language page to an extensible stylesheet language transformation; and
passing the output markup language page to the available output user interface.

28. The method of claim 27 wherein converting the markup language page further comprises selecting an extensible stylesheet language transformation that forms a proper output markup language page for the output user interface.

29. The method of claim 28 further comprising:

receiving an instruction from the user to change the output user interface to a new output user interface; and selecting a different extensible stylesheet language transformation so that the output markup language page is appropriate for the new output user interface.

30. A system for providing a computer-based dialog interface to a user, the system comprising:

a dialog state engine that receives input from the user and that generates a markup language page representing a current dialog state; and a rendering engine that converts the markup language page representing the current dialog state into a markup language page representing an action, wherein the rendering engine comprises extensible stylesheet language transformations that convert the markup language page representing the current dialog state into the markup language page representing an action.

31. A system for providing a computer-based dialog interface to a user, the system comprising:

a dialog state engine that receives input from the user and that generates a markup language page representing a current dialog state; and a rendering engine that converts the markup language page representing the current dialog state into a markup language page representing an action, wherein the rendering engine utilizes a document matching portion of extensible stylesheet language transformations to convert the markup language page representing the current dialog state into machine instructions representing actions that are not described in a markup languages.

32. A system for providing a computer-based dialog interface to a user, the system comprising:

a dialog state engine that receives input from the user and that generates a markup language page representing a current dialog state, wherein the dialog state engine comprises:

a recognition engine that receives user input and generates a markup language page representing the surface semantics of the user input, wherein the recognition engine applies a document generating portion of extensible stylesheet language transformations to produce the markup language page representing the surface semantics; and a discourse engine that converts the markup language page representing the surface semantics into the markup language page representing the dialog state; and a rendering engine that converts the markup language page representing the current dialog state into a markup language page representing an action.

* * * * *